US012583063B2

(12) United States Patent 
Wu et al.

(10) Patent No.: US 12,583,063 B2 
(45) Date of Patent: Mar. 24, 2026

(54) PRESS PLATE MODULE, PRODUCTION LINE, AND CONTROL METHOD

(71) Applicant: Contemporary Amperex Technology (Hong Kong) Limited, Hong Kong (CN)

(72) Inventors: Kai Wu, Ningde (CN); Shaolin Chen, Ningde (CN); Ying Wu, Ningde (CN); Wenchong Wang, Ningde (CN); Qiang Xue, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/211,091

(22) Filed: May 16, 2025

(65) Prior Publication Data

US 2025/0282007 A1 Sep. 11, 2025

Related U.S. Application Data

(63) Continuation of application No. PCT/CN2023/134497, filed on Nov. 27, 2023.

(30) Foreign Application Priority Data

Oct. 11, 2023 (CN) .......................... 202311310316.6

(51) Int. Cl.
*B23K 37/04* (2006.01)
*B23K 101/36* (2006.01)
(Continued)

(52) U.S. Cl.
CPC ..... *B23K 37/0435* (2013.01); *H01M 10/0404* (2013.01); *H01M 50/516* (2021.01); *B23K 2101/36* (2018.08); *Y02P 70/50* (2015.11)

(58) Field of Classification Search
CPC .... Y02P 70/50; Y02E 60/10; H01M 10/0404; H01M 50/516; H01M 10/04;
(Continued)

(56) References Cited

U.S. PATENT DOCUMENTS

| | | | | |
|---|---|---|---|---|
| 10,710,245 | B2 * | 7/2020 | Lauder | B25J 15/0019 |
| 12,103,123 | B2 * | 10/2024 | Okumura | F16B 21/165 |

(Continued)

FOREIGN PATENT DOCUMENTS

| | | |
|---|---|---|
| CN | 202498383 U | 10/2012 |
| CN | 105857577 A | 8/2016 |

(Continued)

OTHER PUBLICATIONS

International Search Report in the international application No. PCT/CN2023/134497, mailed on May 31, 2024. 6 pages with English translation.

(Continued)

*Primary Examiner* — Mahdi H Nejad 
(74) *Attorney, Agent, or Firm* — Ladas & Parry LLP

(57) ABSTRACT

A press plate module, a production line, and a control method are provided. The press plate module includes a press plate assembly and a mounting seat assembly. One of the mounting seat assembly and the press plate assembly is provided with a stop element, and the other is provided with a stop surface. The stop element is selectively extendable and retractable, and the press plate module includes a locked state and an unlocked state. In the locked state, the stop element is in an extended state and abuts against the stop surface, such that the press plate assembly is fixed with the mounting seat assembly, and the mounting seat assembly drives the press plate assembly to move, such that the press plate assembly presses against or separates from a battery. In (Continued)

the unlocked state, the stop element is in a retracted state and separated from the stop surface.

14 Claims, 11 Drawing Sheets

(51) Int. Cl.
  *H01M 10/04*        (2006.01)
  *H01M 50/516*       (2021.01)
(58) Field of Classification Search
  CPC ... H01M 50/505; H01M 50/507; Y02T 10/70;
      B23Q 1/0081; B23Q 1/009; B23K
      37/0435; B23K 2101/36; B23K 37/04
  USPC ......................................................... 269/37
  See application file for complete search history.

(56)             References Cited

U.S. PATENT DOCUMENTS

| | | | | |
|---|---|---|---|---|
| 2009/0075796 | A1* | 3/2009 | Doll ..................... | B25J 15/0491 901/41 |
| 2023/0178789 | A1* | 6/2023 | Wang ................ | H01M 10/0404 29/730 |

FOREIGN PATENT DOCUMENTS

| | | |
|---|---|---|
| CN | 207953047 U | 10/2018 |
| CN | 108942324 A | 12/2018 |
| CN | 109398327 A | 3/2019 |
| CN | 210572643 U | 5/2020 |
| CN | 213705142 U | 7/2021 |
| CN | 113594609 A | 11/2021 |
| CN | 214837664 U | 11/2021 |
| CN | 215574293 U | 1/2022 |
| CN | 215680879 U | 1/2022 |
| CN | 216084990 U | 3/2022 |
| CN | 114850933 A | 8/2022 |
| CN | 115000613 A | 9/2022 |
| CN | 115122372 A | 9/2022 |
| CN | 112621263 B | 11/2022 |
| CN | 217991543 U | 12/2022 |
| CN | 218385322 U | * | 1/2023 |
| CN | 218448018 U | 2/2023 |
| CN | 218536629 U | 2/2023 |
| CN | 116190754 A | 5/2023 |
| CN | 219027222 U | 5/2023 |
| CN | 116207328 A | 6/2023 |
| CN | 219254585 U | 6/2023 |
| CN | 116417740 A | 7/2023 |
| CN | 219471798 U | 8/2023 |
| CN | 219534759 U | * | 8/2023 |
| CN | 219582062 U | 8/2023 |
| CN | 117059867 A | 11/2023 |
| WO | 2004091862 A2 | 10/2004 |
| WO | 2023041082 A1 | 3/2023 |
| WO | 2023130417 A1 | 7/2023 |
| WO | 2023131015 A1 | 7/2023 |
| WO | 2023173426 A1 | 9/2023 |
| WO | WO-2025118326 A1 * | 6/2025 ............. B65G 37/02 |

OTHER PUBLICATIONS

Written Opinion of the International Search Authority in the international application No. PCT/CN2023/134497, mailed on May 31, 2024. 8 pages with English translation.
First Office Action of the Chinese application No. 202311310316.6, issued on Nov. 22, 2023. 19 pages with English translation.
Second Office Action of the Chinese application No. 202311310316. 6, issued on Dec. 18, 2023. 24 pages with English translation.
Notice of Allowance of the Chinese application No. 202311310316. 6, issued on Feb. 26, 2024. 7 pages with English translation.
Supplementary European Search Report in the European application No. 23954986.8, mailed on Nov. 27, 2025.

* cited by examiner

1

PRESS PLATE MODULE, PRODUCTION LINE, AND CONTROL METHOD

CROSS-REFERENCE TO RELATED APPLICATIONS

This application is a continuation of international Patent Application No. PCT/CN2023/134497, filed on Nov. 27, 2023, which claims priority to the Chinese Patent Application No. 202311310316.6, filed on Oct. 11, 2023. The aforementioned patent applications are incorporated herein by reference in their entirety.

TECHNICAL FIELD

Embodiments of this application relate to the technical field of battery production, and in particular, to a press plate module, a production line, and a control method.

BACKGROUND

In the process of battery production and manufacturing, busbar welding needs to be performed on different battery cells in series and parallel connection, so as to form battery modules.

In the process of busbar welding, it is necessary to attach busbar components to poles of the battery cells, so as to improve the welding yield. Therefore, in the process of busbar welding, an action force is applied to the busbar components through a press plate assembly, such that the busbar components and the poles are pressed tightly and attached.

Since the size specifications of different types of battery cells in different battery modules are different, it is often necessary to replace press plate assemblies with different sizes in the switching process of producing different types of battery modules on a production line. In the replacement process, it often takes a long time and high labor costs, which adversely affects production efficiency.

SUMMARY

In view of this, embodiments of this disclosure provide a press plate module, a production line, and a control method for improving the replacement efficiency of a press plate assembly.

To realize the above objective, the technical solutions of the embodiments of this disclosure are realized as follows:

An embodiment of this disclosure provides a press plate module for battery assembly operations. The press plate module includes a press plate assembly and a mounting seat assembly, where one of the mounting seat assembly and the press plate assembly is provided with a stop element and the other is provided with a stop surface, and the stop element is selectively extendable and retractable;

the press plate module has a locked state and an unlocked state;

in the locked state, the stop element is in an extended state and abuts against the stop surface, such that the press plate assembly is fixed with the mounting seat assembly, and the mounting seat assembly is able to drive the press plate assembly to move such that the press plate assembly presses against or is separated from a battery; and in the unlocked state, the stop element is in a retracted state and separated from the stop surface, such that the press plate assembly is separated from the mounting seat assembly.

According to the embodiment of this disclosure, the press plate module is provided with the stop element which is selectively extendable and retractable and the stop surface matched with the stop element, the press plate assembly can be fixed with or separated from the mounting seat assembly by abutting or not between the stop element and the stop surface, and the press plate module can switch between the locked state and the unlocked state only by controlling the stop element to extend and retract, thereby reducing the process steps of replacing the press plate assembly, being conducive to realizing the automatic operation of replacing the press plate assembly, further being conducive to reducing the time for replacing the press plate assembly, improving the working efficiency, and being conducive to improving the production efficiency of the battery.

In some embodiments, the stop element is arranged on the mounting seat assembly, and the stop surface is arranged on the press plate assembly. In this way, a related driving mechanism for driving the stop element to extend and retract is located on the mounting seat assembly, and only one set of stop element and related driving mechanism needs to be configured in the mounting seat assembly and a plurality of different types of press plate assemblies, while only the stop surface formed by a fixed surface needs to be arranged in different types of press plate assemblies, which is conducive to simplifying the structure of the press plate assemblies and reducing the manufacturing cost of the press plate assemblies.

In some embodiments, one of the mounting seat assembly and the press plate assembly is provided with a guide protrusion and the other is provided with a guide hole, and the guide protrusion is able to be inserted into or detached from the guide hole along a moving direction of the press plate assembly. In this way, the stop element can conveniently and smoothly reach the position to realize stop fit with the stop surface during the relative movement of the press plate assembly and the mounting seat assembly, and the probability that the mounting seat assembly cannot be fixed with the press plate assembly since the stop element does not abut against the stop surface after extending is reduced.

In some embodiments, for projections perpendicular to a vertical direction, in the locked state, a projection of the stop element and a projection of the stop surface at least partially overlap; and in the unlocked state, the projection of the stop element is separated from the projection of the stop surface, such that the press plate assembly is separated from the mounting seat assembly under action of gravity.

In this way, by using the self-gravity of the press plate assembly and the mounting seat assembly, on the one hand, in the locked state, the stop element is kept to abut against the stop surface, thereby reducing the probability of accidents caused by the separation between the stop element and the stop surface in the working process. On the other hand, in the unlocked state, the press plate assembly is directly separated from the mounting seat assembly under action of gravity without additional action force, thereby improving the convenience of separation.

In some embodiments, one of the mounting seat assembly and the press plate assembly includes a locking structure, and the other is provided with a fixing hole, where one end of the fixing hole is open for the locking structure to be inserted into the fixing hole, and of a circumferential surface of a part of the locking structure inserted into the fixing hole and a circumferential inner wall of the fixing hole, one is provided with the stop element and the other is provided with the stop surface.

On the one hand, due to the constraint between the surface of the locking structure and the inner wall of the fixing hole, the stop element can conveniently reach the position to realize stop fit with the stop surface, and the probability that the mounting seat assembly cannot be fixed with the press plate assembly since the stop element does not abut against the stop surface after extending is reduced. On the other hand, the surface of the locking structure and the inner wall of the fixing hole can share the load between the stop element and the stop surface, such that the probability of damage of a driving structure for driving the stop element to extend and retract due to excessive load is reduced.

In some embodiments, the mounting seat assembly includes the locking structure and an adapter member, the locking structure is arranged at a side of the adapter member facing towards the press plate assembly, at least part of the locking structure protrudes from a surface of the adapter member at the side facing towards the press plate assembly, and the stop element is located at a protruding part of the locking structure. In this way, on the one hand, the adapter member can abut against the press plate assembly along the moving direction of the press plate assembly, thereby restricting the relative position between the press plate assembly and the mounting seat assembly along the moving direction of the press plate assembly, playing a limiting role, and reducing the probability that the locking structure cannot extend and retract due to collision along the moving direction of the press plate assembly. On the other hand, the stop element is exposed on the locking structure, such that an extendable and retractable state of the stop element is convenient to observe, which is conducive to directly judging whether the function of driving the stop element to extend and retract by the locking structure operates normally.

In some embodiments, the mounting seat assembly includes a mounting piece and a driving piece, the driving piece is arranged on the mounting piece, and a driving end of the driving piece is drivably connected to the adapter member to drive the adapter member to extend and retract. Therefore, on the one hand, in the unlocked state, the driving piece realizes the purpose of driving the locking structure to be inserted into or pulled out from the fixing hole. On the other hand, in the locked state, the press plate assembly is driven to move by the driving piece, so as to realize the purpose of pressing or separating the press plate assembly from the battery.

In some embodiments, the mounting seat assembly includes a guide protrusion, and the press plate assembly is provided with a guide hole, where the guide hole is open at a side facing towards the mounting seat assembly, the guide protrusion and the locking structure are located on a same side of the adapter member, the guide protrusion is able to be inserted into the guide hole along an insertion direction of the locking structure into the fixing hole, the locking structure protrudes from the surface of the adapter member at the side facing towards the press plate assembly by a height of H1, and the guide protrusion protrudes from the surface of the adapter member at the side facing towards the press plate assembly by a height of H2, where H1≤H2. In this way, the guide protrusion is inserted into the guide hole before the locking structure is inserted into the fixing hole, and the guide protrusion is first matched with the guide hole to realize the positioning between the mounting seat assembly and the press plate assembly, so as to reduce the probability that the locking structure is damaged on impact due to the dislocation between the locking structure and the fixing hole, and meanwhile, be conducive to improving the positioning accuracy of assembling and disassembling the press plate assembly.

In some embodiments, the locking structure is a pneumatic steel ball locking clamp, and steel balls of the pneumatic steel ball locking clamp form the stop element. In this way, by controlling pressure of gas conveyed to the pneumatic steel ball locking clamp, the steel balls can be driven to extend and retract, thereby facilitating the automatic control over the extendable and retractable movement of the stop element.

In some embodiments, the inner wall of the fixing hole is provided with a fixing protrusion, and a surface of the fixing protrusion at a side facing away from the mounting seat assembly forms the stop surface. In this way, the stop element can conveniently abut against the fixing protrusion in the extended state and be separated from the fixing protrusion in the retracted state.

In some embodiments, the press plate assembly includes a press plate body and a fixing shaft sleeve, where the press plate body is provided with a first mounting hole, at least one end of the first mounting hole is open, and the fixing shaft sleeve is provided with a through second mounting hole. The fixing shaft sleeve covers the opening of the first mounting hole and is detachably connected to the press plate body. The first mounting hole communicates with the second mounting hole to form the fixing hole. The fixing protrusion is arranged on an inner wall of the second mounting hole. In this way, there is no need to directly process and manufacture the fixing protrusion on the press plate body, thereby reducing the production and manufacturing difficulty. After long-term use, the fixing protrusion is worn, only the fixing shaft sleeve needs to be replaced, and the whole press plate assembly does not need to be disassembled and maintained, such that the maintenance efficiency is improved, and the workload and maintenance cost are reduced.

An embodiment of this disclosure further provides a production line for battery assembly operations. The production line includes the press plate module according to any one of the foregoing embodiments, and the press plate module is configured to selectively press against a battery. In this way, the press plate module switches between a locked state and an unlocked state, such that the efficiency of replacing the press plate assembly is improved in the switching process of producing different types of batteries on a production line.

In some embodiments, the production line includes a driving module, and a driving end of the driving module is drivably connected to the mounting seat assembly to drive the press plate module to move between a working station and a replacement station. In this way, the driving module drives the press plate module to move between the working station and the replacement station, so as to avoid interference with battery assembly in the process of replacing the press plate assembly.

In some embodiments, the production line includes a temporary storage module, where the temporary storage module includes a plurality of trays and a driving assembly, where the trays are configured for placing the press plate assemblies, and the driving assembly is drivably connected to each of the trays, so as to selectively move one of the trays to a waiting station, enabling the tray to receive a press plate assembly separated from the mounting seat assembly, or enabling a press plate assembly placed on the tray to be fixed with the mounting seat assembly. In this way, the driving assembly is conducive to realizing the automatic control of moving the press plate assembly that needs to be replaced to the waiting station and cooperating with the press plate module.

In some embodiments, the mounting seat assembly is able to drive the press plate assembly to move along a vertical direction, and under a condition that the press plate module is located in the replacement station and one of the trays is located in the waiting station, the tray is located below the mounting seat assembly. In this way, the press plate assembly placed on the tray is constrained in position by the fit of a fixing boss and a guide hole, and the probability that the press plate assembly falls off the tray during the movement with the tray is reduced.

An embodiment of this disclosure further provides a control method for replacing a press plate assembly. The control method includes:

controlling a first driving motor in a driving module to drive a press plate module to move from a working station to a replacement station;

controlling a second driving motor in a driving assembly to drive an empty tray to move to a waiting station;

controlling a first solenoid valve such that a cylinder in a mounting seat assembly drives a press plate assembly to move downwards to a lowest position;

controlling a second solenoid valve to retract steel balls in a pneumatic steel ball locking clamp, thereby changing the press plate module from a locked state to an unlocked state, and dropping the press plate assembly onto the tray at the waiting station;

controlling the first solenoid valve such that the cylinder in the mounting seat assembly drives an adapter member to move upwards to a highest position;

controlling the second driving motor in the driving assembly to drive the tray currently located at the waiting station to move away from the waiting station;

controlling the second driving motor in the driving assembly to drive the tray, on which the press plate assembly to be replaced is placed, to move to the waiting station;

controlling the first solenoid valve such that the cylinder in the mounting seat assembly drives the adapter member to move downwards to the lowest position;

controlling the second solenoid valve such that the steel balls in the pneumatic steel ball locking clamp extend out, thereby changing the press plate module from the unlocked state to the locked state;

controlling the first solenoid valve such that the cylinder in the mounting seat assembly drives the press plate assembly to move upwards to the highest position; and controlling the first driving motor in the driving module to drive the press plate module to move from the replacement station to the working station.

In this way, rapid and automatic replacement of the press plate assembly is realized conveniently, and the working efficiency of replacing the press plate assembly is improved.

6

Figure 5:
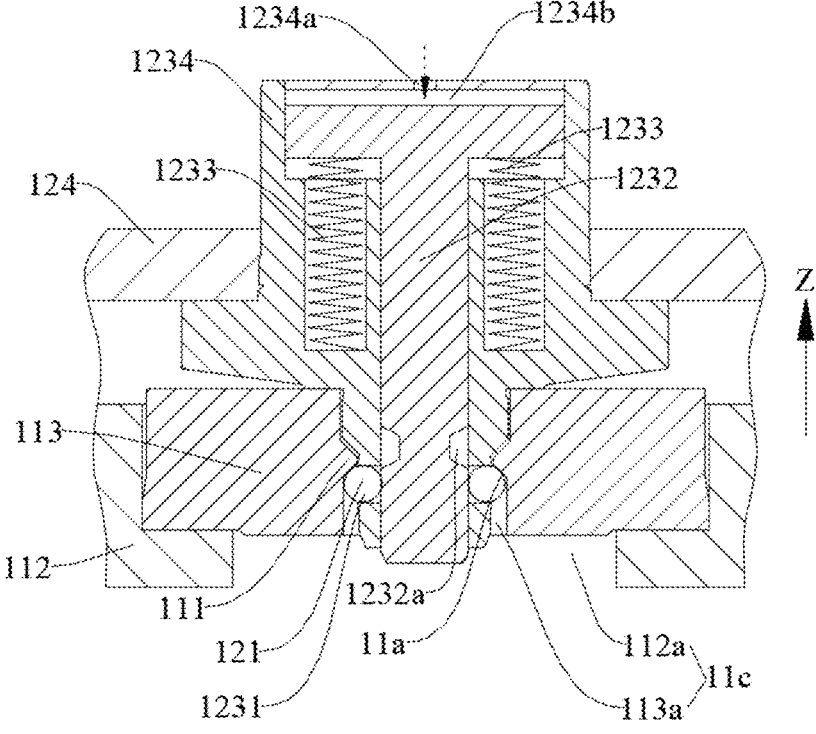
Figure 6:
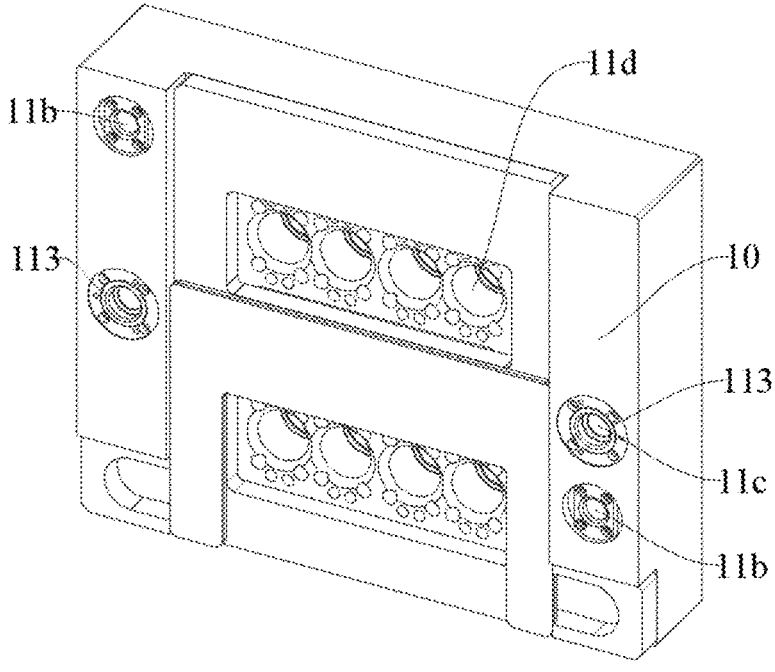
Figure 7:
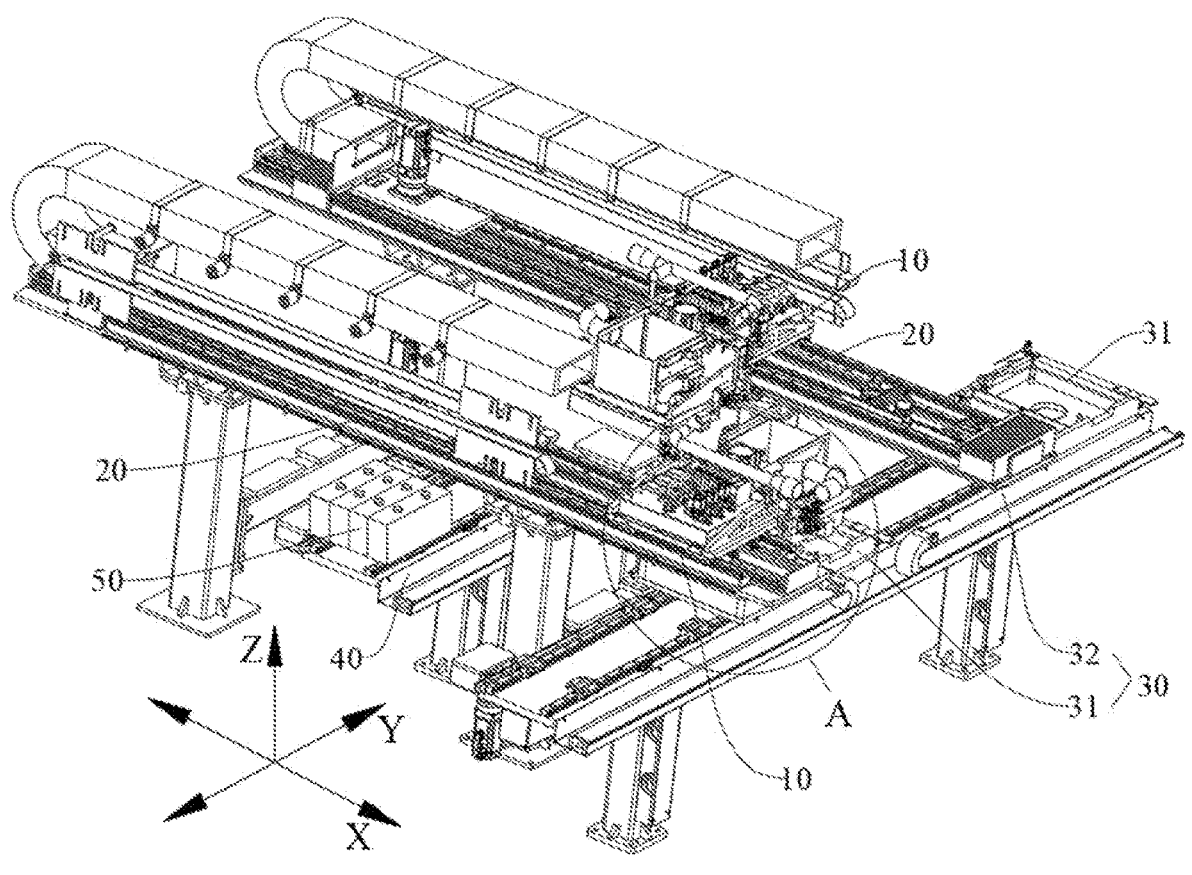
Figure 8:
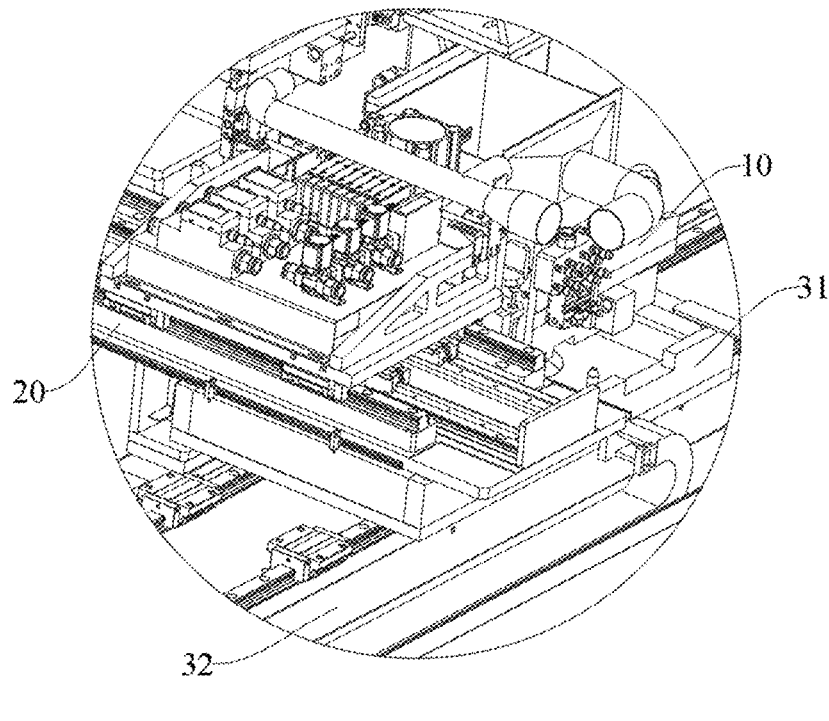
Figure 9:
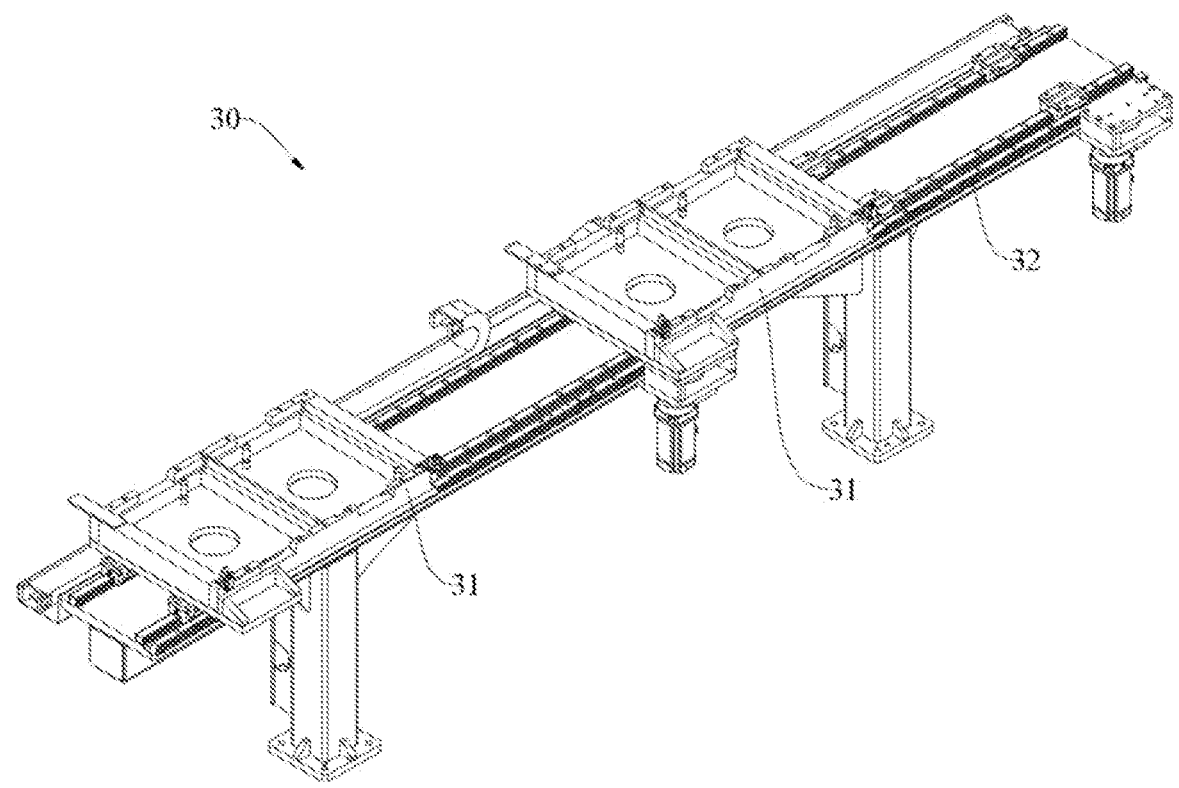
Figure 10:
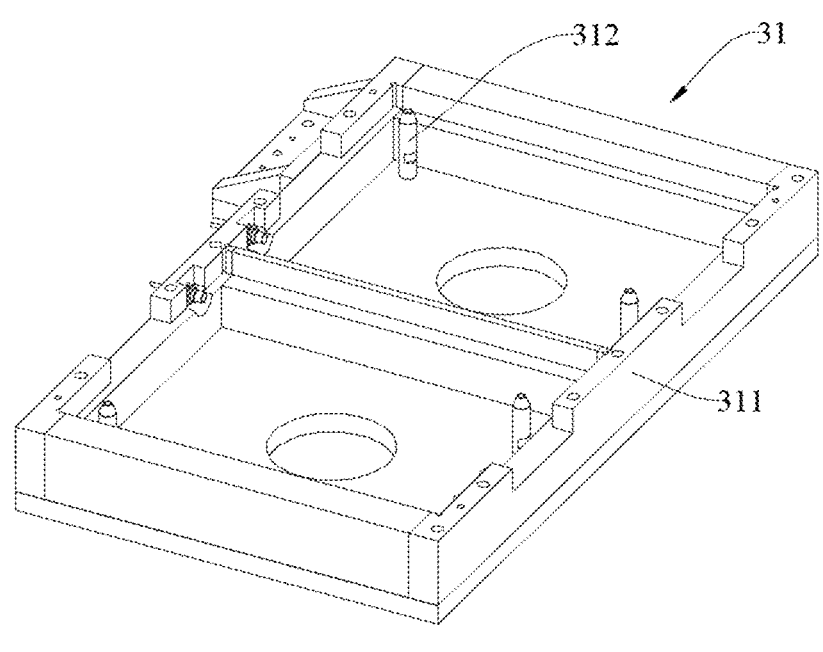
Figure 11:
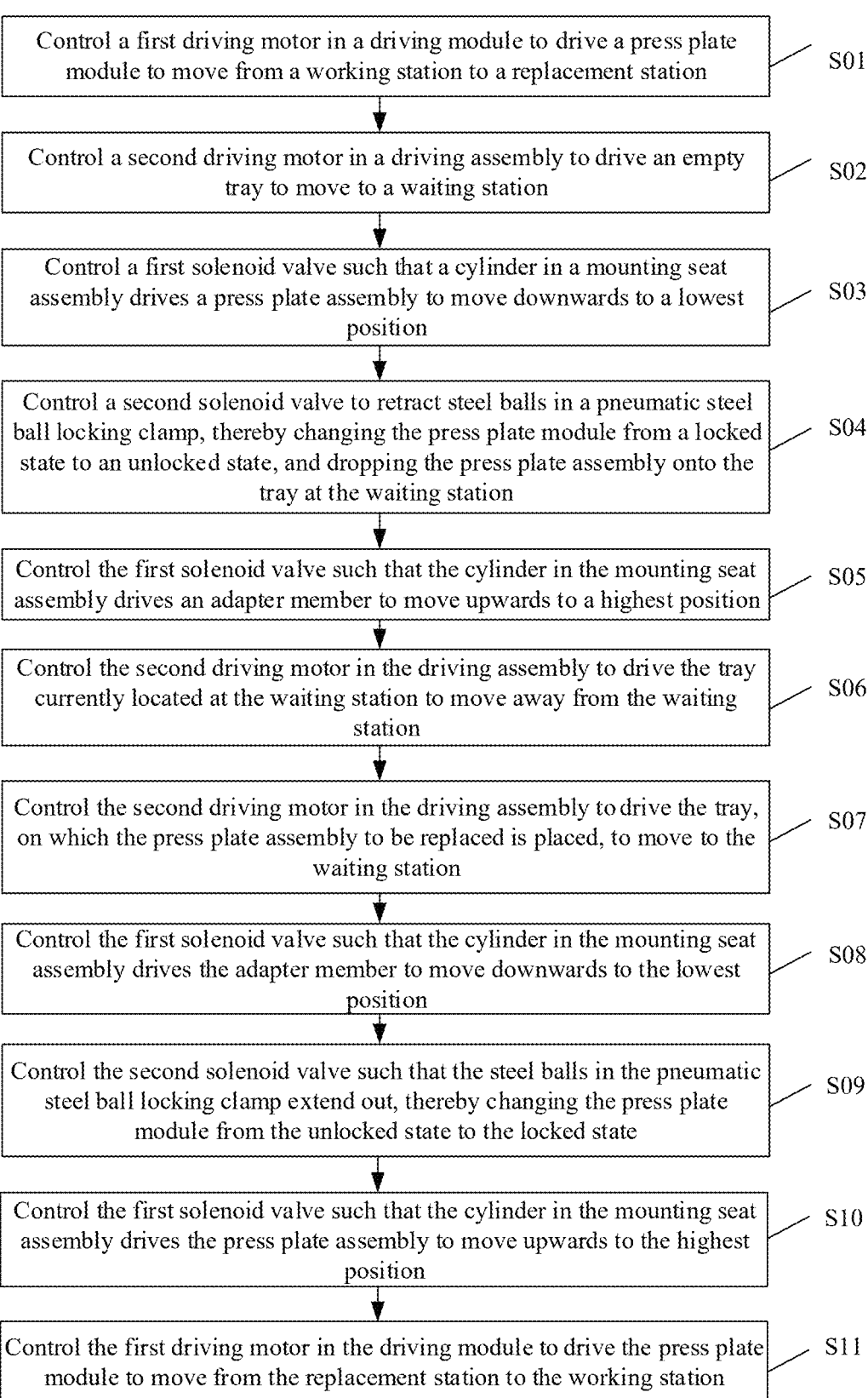

FIG. 5 is a schematic diagram of a locking structure and a fixing hole in a locked state according to an embodiment of this disclosure, where a dotted arrow indicates airflow entering the locking structure;

FIG. 6 is a schematic diagram of a press plate assembly according to an embodiment of this disclosure;

FIG. 7 is a schematic diagram of a production line according to an embodiment of this disclosure;

FIG. 8 is a partially enlarged schematic diagram of position A in FIG. 7;

FIG. 9 is a schematic diagram of a temporary storage module according to an embodiment of this disclosure;

FIG. 10 is a schematic diagram of a tray according to an embodiment of this disclosure; and FIG. 11 is a schematic diagram of steps of a control method of a production line according to an embodiment of this disclosure.

LIST OF REFERENCE SIGNS press plate module 10;
press plate assembly 11;
stop surface 11*a;*
guide hole 11*b;*
fixing hole 11*c;*
relief hole 11*d;*
fixing protrusion 111;
press plate body 112;
first mounting hole 112*a;*
fixing shaft sleeve 113;
second mounting hole 113*a;*
mounting seat assembly 12;
stop element 121;
guide protrusion 122;
locking structure 123;
steel ball 1231;
piston rod 1232;
accommodation slot 1232*a;*
elastic piece 1233;
housing 1234;
air inlet hole 1234*a;*
accommodating cavity 1234*b;*
adapter member 124;
mounting piece 125;
driving piece 126;
driving module 20;
temporary storage module 30;
tray 31;
tray body 311;
fixing boss 312;
driving assembly 32;
conveying module 40; and
battery 50.

DETAILED DESCRIPTION

It should be noted that, in the case of no conflict, embodiments in this disclosure and the technical features in the embodiments can be combined with each other, and the detailed description in the specific embodiments should be understood as an explanation of the purpose of this disclosure and should not be regarded as an undue restriction on this disclosure.

Unless otherwise defined, all technical and scientific terms used herein have the same meanings as commonly understood by a person skilled in the technical field of this disclosure. The terms used herein are merely intended to describe the specific embodiments rather than to limit this disclosure. The terms "include" and "contain" and any variations thereof in the specification and detailed description of drawings of this disclosure are intended as non-exclusive inclusion.

In the description of the embodiments of this disclosure, the technical terms "first", "second", "third" and the like are merely intended to distinguish between different items but not intended to indicate or imply relative importance or implicitly specify the quantity of the indicated technical features, specific order, or order of precedence. In the description of the embodiments of this disclosure, unless otherwise expressly specified, "a plurality of" means two or more.

Reference to "embodiment" herein means that a specific feature, structure or characteristic described with reference to the embodiment may be included in at least one embodiment of this disclosure. The presence of the phrase in various places in the specification does not necessarily mean the same embodiment, nor is it a separate or alternative embodiment that is mutually exclusive with other embodiments. A person skilled in the art explicitly and implicitly understands that the embodiments described herein may be combined with other embodiments.

In the description of the embodiments of this disclosure, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between contextually associated objects.

In the description of the embodiments of this disclosure, for ease of description, as shown by the arrow in FIG. 7, a direction where the arrow X is located is a first direction, a direction where the arrow Y is located is a second direction, a direction where the arrow Z is located is a vertical direction, and the direction indicated by the arrow Z along the vertical direction is called "up" and "top", and the opposite direction is called "down".

In the description of the embodiments of this disclosure, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediate medium; or understood as internal communication between two components or interaction between two components. A person of ordinary skill in the art can understand specific meanings of these terms in the embodiments of this disclosure based on specific situations.

In the description of the embodiments of this disclosure, unless otherwise explicitly provided and defined, the technical term "contact" should be understood in a broad sense, which may be direct contact, contact through an intermediate medium layer, contact with no interaction force between the two in contact, or contact with interaction force between the two in contact.

The following makes a detailed description of the embodiments of this disclosure.

At present, batteries are increasingly widely used in life and industry. The batteries are not only used in energy storage power systems such as hydro, thermal, wind, and solar power stations, but also widely used in electric means of transport such as electric bicycles, electric motorcycles, and electric vehicles, and used in many other fields such as aerospace. The market demand for the batteries keeps soaring with the increase of the application fields of the batteries.

A plurality of battery cells are arranged in one battery, and the plurality of battery cells are electrically connected in series and parallel through busbar components.

The busbar components weld poles of the plurality of battery cells in a welding way. In the process of welding the poles and the busbar components, a press plate assembly needs to press against between the busbar components and the poles so as to attach the poles and the busbar components, thereby improving the welding yield.

In the process of producing different types of batteries, there are differences in parameters such as the size and shape of the poles of the battery cells with different sizes, and the sizes of the corresponding busbar components are also different. Therefore, sizes of press plate assemblies required to provide an abutting function in the production process of different types of batteries are different, and different types of press plate assemblies need to be replaced in the process of changing to produce products on a production line.

An embodiment of this disclosure aims to provide a press plate module that can separate and fix a press plate assembly by switching between unlocking and locking, thereby facilitating rapid replacement of different types of press plate assemblies.

Specifically, an embodiment of this disclosure provides a press plate module 10. Referring to FIGS. 1 to 4, press plate module 10 is configured for assembly operations of a battery 50. The press plate module 10 includes a press plate assembly 11 and a mounting seat assembly 12. One of the mounting seat assembly 12 and the press plate assembly 11 is provided with a stop element 121 and the other is provided with a stop surface 11a. The stop element 121 is selectively extendable and retractable, and the press plate module 10 has a locked state and an unlocked state. In the locked state, the stop element 121 is in an extended state and abuts against the stop surface 11a, such that the press plate assembly 11 is fixed with the mounting seat assembly 12, and the mounting seat assembly 12 is able to drive the press plate assembly 11 to move, such that the press plate assembly 11 presses against or is separated from the battery 50. In the unlocked state, the stop element 121 is in a retracted state and separated from the stop surface 11a, such that the press plate assembly 11 is separated from the mounting seat assembly 12.

The press plate assembly 11 is configured to apply action force between the busbar components and the poles during the assembly of the battery 50, such that the busbar components and the poles are attached to each other, thereby facilitating the welding between the poles and the busbar components.

The specific form of the press plate assembly 11 to apply the action force between the busbar components and the poles is not limited. For example, the press plate assembly 11 pushes the busbar components from a side of the busbar components facing away from cells of the battery 50, such that the busbar components are sandwiched between the press plate assembly 11 and the cells of the battery 50, and the busbar components are attached to the poles.

The mounting seat assembly 12 provides a mounting position for the press plate assembly 11. In addition, in the locked state, a driving end of the mounting seat assembly 12 can drive the press plate assembly 11 to move, such that the press plate assembly 11 can push the busbar components and the poles to be attached. Alternatively, the press plate assembly 11 is separated from the battery 50, so as to take out the battery 50 after the operation and replace the battery 50 with a new battery 50 to be operated.

The driving end of the mounting seat assembly 12 is detachably connected to the press plate assembly 11, such that different types of press plate assemblies 11 can be respectively connected to the mounting seat assembly 12 through disassembly and assembly, so as to meet the requirements of different types of cells of the battery 50 and busbar components.

The stop surface 11*a* is at least part of a surface of a solid structure on the mounting seat assembly 12 or the press plate assembly 11.

The stop element 121 and the stop surface 11*a* can selectively realize stop fit. Specifically, the stop element 121 can be selectively extendable or retractable. When the stop element 121 is in the extended state, the mounting seat assembly 12 and the press plate assembly 11 are constrained in their relative positions by the abutting action force between the stop element 121 and the stop surface 11*a*, so as to realize the purpose of fixing the press plate assembly 11 and the mounting seat assembly 12, such that the press plate module 10 is in the locked state, and the press plate assembly 11 can move under the driving of the mounting seat assembly 12. When the stop element 121 is in the retracted state, the stop element 121 is separated from the stop surface 11*a*, the abutting action force between the stop element 121 and the stop surface 11*a* disappears, and the mounting seat assembly 12 and the press plate assembly 11 can move relatively, such that the press plate assembly 11 is separated from the mounting seat assembly 12, and the replacement of different types of press plate assemblies 11 can be realized.

It can be understood that the time when the stop element 121 extends or retracts is selected according to the time when the press plate assembly 11 needs to be replaced.

According to the embodiment of this disclosure, the press plate module 10 is provided with the stop element 121 which is selectively extendable and retractable and the stop surface 11*a* matched with the stop element, the press plate assembly 11 can be fixed with or separated from the mounting seat assembly 12 by abutting or not between the stop element 121 and the stop surface 11*a*, and the press plate module 10 can switch between the locked state and the unlocked state only by controlling the stop element 121 to extend and retract, thereby reducing the process steps of replacing the press plate assembly 11, being conducive to realizing the automatic operation of replacing the press plate assembly 11, further being conducive to reducing the time for replacing the press plate assembly 11, improving the working efficiency, and being conducive to improving the production efficiency of the battery 50.

The battery 50 may be, but not limited to, used in energy storage power systems, vehicles, ships, aircraft and other electric apparatuses.

The battery 50 includes a plurality of battery cells. The battery cell may be a secondary battery, and the secondary battery is a battery cell that is reusable through activation of an active material by charging the battery cell that is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead storage battery, or the like. The specific type of the battery cell is not limited by the embodiments of this disclosure.

As an example, the battery cell may be a cylindrical cell, a prismatic cell, a pouch cell, or a battery cell in another shape. The prismatic cell includes a square-shell battery cell, a blade battery cell, and a polygonal prism battery. An example of the polygonal prism battery is a hexagonal prism battery. The type of the battery cell is not particularly limited by the embodiments of this disclosure.

The following makes a detailed description of a press plate module 10 in some embodiments of this disclosure.

It can be understood that corresponding parts need to form a driving mechanism to realize the purpose of driving the stop element 121 to extend and retract, and the stop surface 11*a* may be a fixed surface of the solid structure.

In some embodiments, referring to FIGS. 1 to 4, the stop element 121 is arranged on the mounting seat assembly 12, and the stop surface 11*a* is arranged on the press plate assembly 11. In this way, the related driving mechanism for driving the stop element 121 to extend and retract is located on the mounting seat assembly 12, and only one set of stop element 121 and related driving mechanism needs to be configured in the mounting seat assembly 12 and a plurality of different types of press plate assemblies 11, while only the stop surface 11*a* formed by the fixed surface needs to be arranged in different types of press plate assemblies 11, which is conducive to simplifying the structure of the press plate assemblies 11 and reducing the manufacturing cost of the press plate assemblies 11.

It can be understood that only after the mounting seat assembly 12 and the press plate assembly 11 reach a preset locking position can the stop element 121 extend out to realize the stop fit with the stop surface 11*a*.

Figure 4:
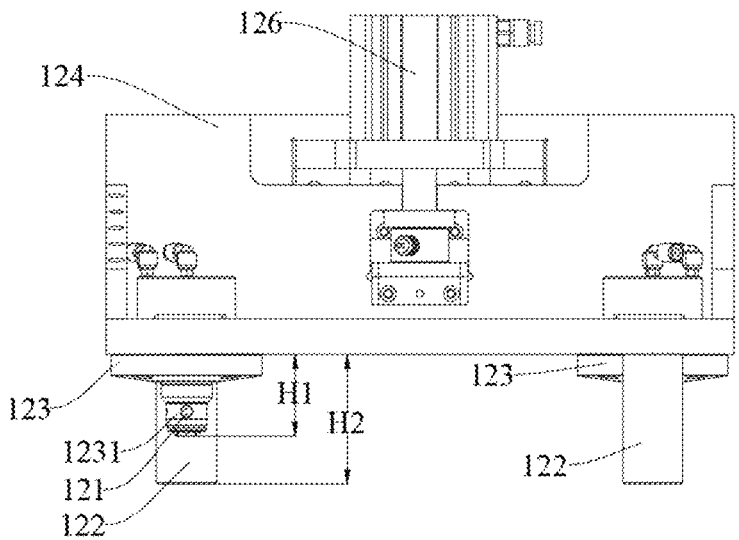
FIG. 4 is a schematic diagram of a mounting seat assembly according to an embodiment of this disclosure.

In some embodiments, referring to FIG. 4, one of the mounting seat assembly 12 and the press plate assembly 11 is provided with guide protrusions 122 and the other is provided with guide holes 11*b*, and the guide protrusions 122 are able to be inserted into or detached from the guide holes 11*b* along a moving direction of the press plate assembly 11.

The guide protrusions 122 are arranged on one of the mounting seat assembly 12 and the press plate assembly 11 and extend towards the other.

After the guide protrusions 122 are inserted into the guide holes 11*b*, projections of inner walls of the guide holes 11*b* and surfaces of the guide protrusions 122 in a direction perpendicular to the moving direction of the press plate assembly 11 at least partially overlap, such that the inner walls of the guide holes 11*b* and the surfaces of the guide protrusions 122 form stop fit, thereby constraining the relative position between the press plate assembly 11 and the mounting seat assembly 12 in the moving process. In this way, the stop element 121 can conveniently and smoothly reach the position to realize stop fit with the stop surface 11*a* during the relative movement of the press plate assembly 11 and the mounting seat assembly 12, and the probability that the mounting seat assembly 12 cannot be fixed with the press plate assembly 11 since the stop element 121 does not abut against the stop surface 11*a* after extending is reduced.

It can be understood that, referring to FIG. 4, the guide protrusions 122 extend along the moving direction of the press plate assembly 11.

For the projections perpendicular to the moving direction of the press plate assembly 11, the projections of the guide protrusions 122 are within the projections of the guide holes 11*b*.

It can be understood that the relative position between the press plate assembly 11 and the mounting seat assembly 12 facilitates separation of the press plate assembly 11 and the mounting seat assembly 12 when the stop element 121 is in the retracted state.

Figure 2:
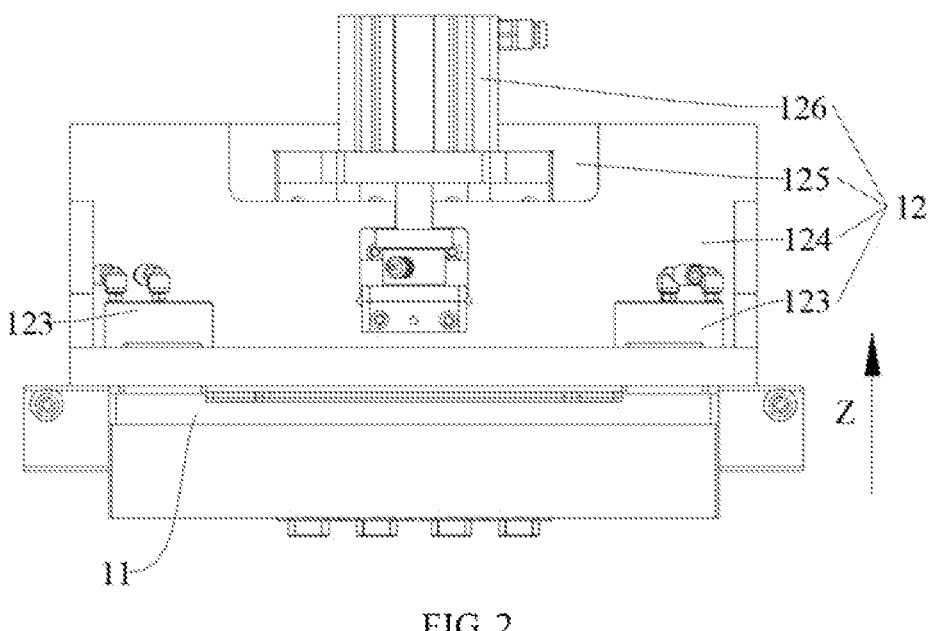
FIG. 2 is a schematic diagram of the embodiment in FIG. 1 from a second perspective.

In some embodiments, referring to FIGS. 2, 4, and 5, for the projections perpendicular to the vertical direction, in the locked state, a projection of the stop element 121 and a projection of the stop surface 11a at least partially overlap; and in the unlocked state, the projection of the stop element 121 is separated from the projection of the stop surface 11a, such that the press plate assembly 11 is separated from the mounting seat assembly 12 under action of gravity.

The vertical direction is a positive or negative direction along gravity.

In the locked state, one of the stop element 121 and the stop surface 11a is located below the other, such that under action of gravity, parts with the projections overlapping of the stop element 121 and the stop surface 11a can abut against each other along the vertical direction. In the unlocked state, the projection of the stop element 121 is separated from the projection of the stop surface 11a, that is, the press plate assembly 11 and the mounting seat assembly 12 are not constrained along the vertical direction and can move relatively, such that one of the press plate assembly 11 and the mounting seat assembly 12 can fall off and be separated from the other under action of gravity.

In this way, the self-gravity of the press plate assembly 11 and the mounting seat assembly 12 is used, on the one hand, in the locked state, the stop element 121 is kept to abut against the stop surface 11a, thereby reducing the probability of accidents caused by the separation between the stop element 121 and the stop surface 11a in the working process. On the other hand, in the unlocked state, the press plate assembly 11 is directly separated from the mounting seat assembly 12 under action of gravity without additional action force, thereby improving the convenience of separation.

In some embodiments, the moving direction of the press plate assembly 11 is the vertical direction, such that the press plate assembly 11 presses against the battery 50 by means of own gravity, thereby improving the attachment effect between the poles and the busbar components.

In some embodiments, referring to FIG. 2, the press plate assembly 11 is located below the mounting seat assembly 12, such that the press plate assembly 11 that needs to be replaced can directly fall off and be separated from the mounting seat assembly 12 under action of gravity in the unlocked state.

In some embodiments, an extendable and retractable direction of the stop element 121 is perpendicular to the vertical direction.

Figure 3:
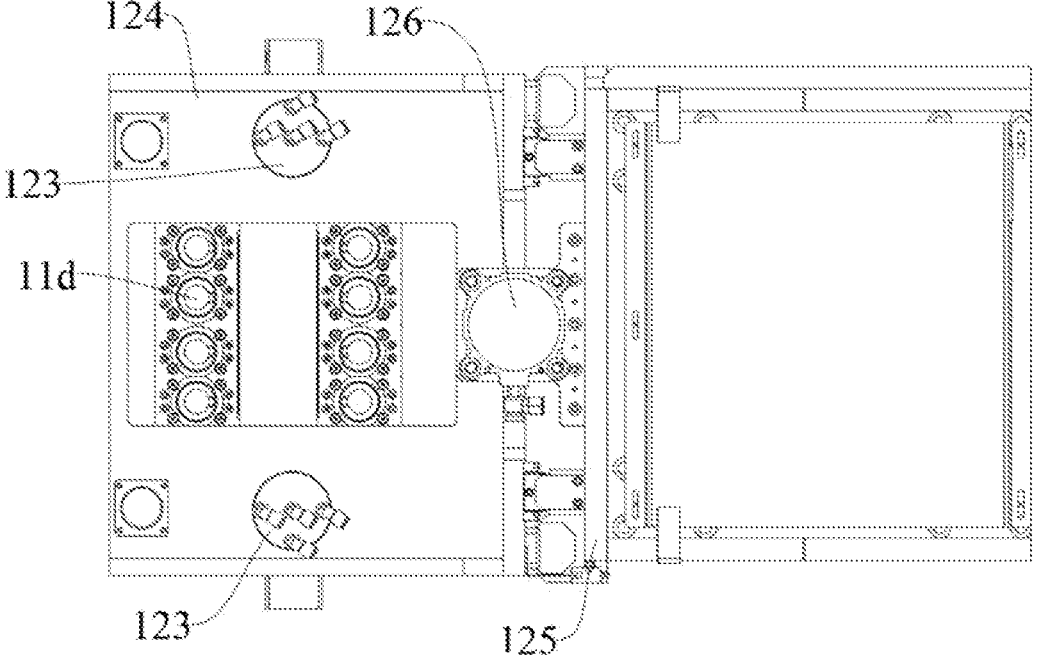
FIG. 3 is a schematic diagram of the embodiment in FIG. 1 from a third perspective.

In some embodiments, referring to FIGS. 2 to 4, one of the mounting seat assembly 12 and the press plate assembly 11 includes locking structures 123, and the other is provided with fixing holes 11c, where one end of the fixing hole 11c is open for the locking structure 123 to be inserted into the fixing hole 11c, and of a circumferential surface of a part of the locking structure 123 inserted into the fixing hole 11c and a circumferential inner wall of the fixing hole 11c, one is provided with the stop element 121 and the other is provided with the stop surface 11a.

The fixing hole 11c is configured to cooperate with the locking structure 123, so as to realize the stop fit between the stop element 121 and the stop surface 11a.

On the one hand, due to the constraint between the surface of the locking structure 123 and the inner wall of the fixing hole 11c, the stop element 121 can conveniently reach the position to realize stop fit with the stop surface 11a, and the probability that the mounting seat assembly 12 cannot be fixed with the press plate assembly 11 since the stop element 121 does not abut against the stop surface 11a after extending is reduced. On the other hand, the surface of the locking structure 123 and the inner wall of the fixing hole 11c can share the load between the stop element 121 and the stop surface 11a, such that the probability of damage of a driving structure for driving the stop element 121 to extend and retract due to excessive load is reduced.

The fixing hole 11c may be a through hole or a blind hole.

In some embodiments, referring to FIGS. 2 to 4, the mounting seat assembly 12 includes the locking structures 123 and an adapter member 124, the locking structures 123 are arranged at a side of the adapter member 124 facing towards the press plate assembly 11, at least part of the locking structures 123 protrudes from a surface of the adapter member 124 at the side facing towards the press plate assembly 11, and stop elements 121 are located at protruding parts of the locking structures 123.

The adapter member 124 is configured to provide an installation position for the installation of the locking structures 123.

The stop elements 121 are located on the locking structures 123, that is, the locking structures 123 are provided with driving mechanisms for at least partially driving the stop elements 121 to extend and retract.

The locking structures 123 protrude from a side of the adapter member 124 facing towards the press plate assembly 11. In this way, on the one hand, the adapter member 124 can abut against the press plate assembly 11 along the moving direction of the press plate assembly 11, thereby constraining the relative position between the press plate assembly 11 and the mounting seat assembly 12 along the moving direction of the press plate assembly 11, playing a limiting role, and reducing the probability that the locking structures 123 cannot extend and retract due to collision along the moving direction of the press plate assembly 11. On the other hand, the stop elements 121 are exposed on the locking structures 123, such that an extendable and retractable state of the stop elements 121 is convenient to observe, which is conducive to directly judging whether the function of driving the stop elements 121 to extend and retract by the locking structures 123 operates normally.

It can be understood that for the projections perpendicular to the moving direction of the press plate assembly 11, a projection of the adapter member 124 and a projection of the press plate assembly 11 at least partially overlap, such that the adapter member 124 and the press plate assembly 11 can abut against each other along the moving direction of the press plate assembly 11.

A specific way for the mounting seat assembly 12 to drive the press plate assembly 11 to move is not limited.

Figure 1:
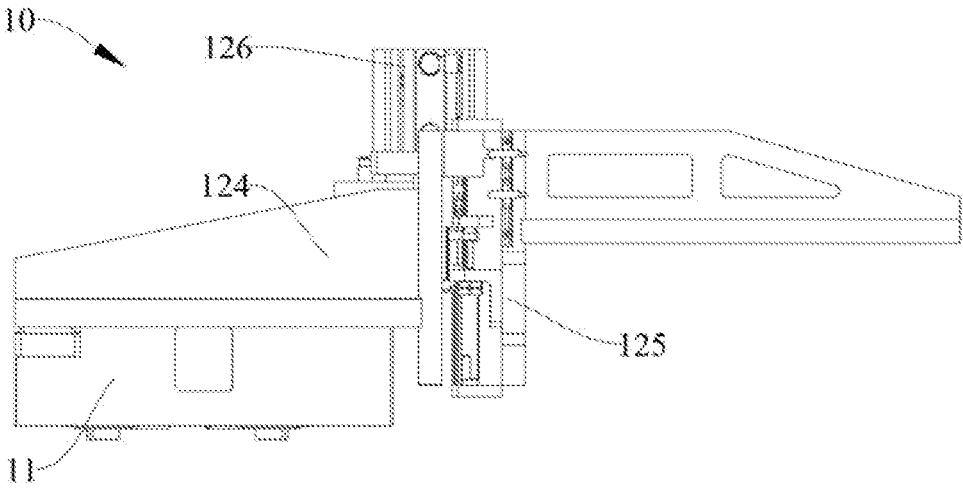
FIG. 1 is a schematic diagram of a press plate module from a first perspective according to an embodiment of this disclosure.

Exemplarily, referring to FIGS. 1 to 3, the mounting seat assembly 12 includes a mounting piece 125 and a driving piece 126, the driving piece 126 is arranged on the mounting piece 125, and a driving end of the driving piece 126 is drivably connected to the adapter member 124 to drive the adapter member 124 to extend and retract. The driving end of the driving piece 126 can extend and retract relative to the mounting piece 125, thereby driving the adapter member 124 and the locking structures 123 to move. Therefore, on the one hand, in the unlocked state, the driving piece 126 realizes the purpose of driving the locking structures 123 to be inserted into or pulled out from the fixing holes 11c. On the other hand, in the locked state, the press plate assembly 11 is driven to move by the driving piece 126, so as to realize the purpose of pressing or separating the press plate assembly 11 from the battery 50. The specific type of the driving piece 126 is not limited, such as an air cylinder and an electric cylinder. It can be understood that in the embodiment where the driving piece 126 is an air cylinder, a piston rod of the cylinder is connected to the adapter member 124, and the piston rod need to be controlled to extend and retract by a first solenoid valve.

In some embodiments, referring to FIGS. 1 to 3, the mounting piece 125 is a plate-like structure extending along the vertical direction, and the adapter member 124 includes a vertical portion and a horizontal portion, where the vertical portion extends along the vertical direction, the horizontal portion extends perpendicular to the vertical direction, and the driving end of the driving piece 126 is drivably connected to the vertical portion; and one of the mounting piece 125 and the vertical portion is provided with a sliding block and the other is provided with a guide rail, the guide rail extends along the vertical direction, the sliding block and the guide rail are in sliding fit, and the locking structures 123 are arranged on the horizontal portion. Through the fit between the sliding block and the guide rail, the resistance when the driving piece 126 drives the adapter member 124 to move is reduced.

In some embodiments, referring to FIGS. 4 and 6, the mounting seat assembly 12 includes guide protrusions 122, and the press plate assembly 11 is provided with guide holes 11*b*, where the guide hole 11*b* is open at a side facing towards the mounting seat assembly 12, the guide protrusion 122 and the locking structure 123 are located on a same side of the adapter member 124, the guide protrusion 122 is able to be inserted into the guide hole 11*b* along an insertion direction of the locking structure 123 into the fixing hole 11*c*, the locking structure 123 protrudes from the surface of the adapter member 124 at the side facing towards the press plate assembly 11 by a height of H1, and the guide protrusion 122 protrudes from the surface of the adapter member 124 at the side facing towards the press plate assembly 11 by a height of H2, where H1≤H2.

The height of the locking structure 123 protruding from the surface of the adapter member 124 at the side facing towards the press plate assembly 11 refers to a distance between an end surface of the locking structure 123 at an end facing away from the adapter member 124 and the surface of the adapter member 124 at the side facing towards the press plate assembly 11.

The way to measure the specific value of H1 is not limited. For example, the vernier caliper is configured to respectively abut against the end surface of the locking structure 123 at the end facing away from the adapter member 124 and the surface of the adapter member 124 at the side facing towards the press plate assembly 11 so as to read the distance value therebetween.

The height of the guide protrusion 122 protruding from the surface of the adapter member 124 at the side facing towards the press plate assembly 11 refers to a distance between an end surface of the guide protrusion 122 at an end facing away from the adapter member 124 and the surface of the adapter member 124 at the side facing towards the press plate assembly 11.

The way to measure the specific value of H2 is not limited. For example, the vernier caliper is configured to respectively abut against the end surface of the guide protrusion 122 at the end facing away from the adapter member 124 and the surface of the adapter member 124 at the side facing towards the press plate assembly 11 so as to read the distance value therebetween.

In this way, the guide protrusion 122 is inserted into the guide hole 11*c* before the locking structure 123 is inserted into the fixing hole 11*c*, and the guide protrusion 122 is first matched with the guide hole 11*b* to realize the positioning between the mounting seat assembly 12 and the press plate assembly 11, so as to reduce the probability that the locking structure 123 is damaged on impact due to the dislocation between the locking structure 123 and the fixing hole 11*c*, and meanwhile, be conducive to improving the positioning accuracy of assembling and disassembling the press plate assembly 11.

The locking structure 123 is not specifically limited.

Exemplarily, referring to FIG. 5, the locking structure 123 is a pneumatic steel ball locking clamp, and steel balls 1231 of the pneumatic steel ball locking clamp form the stop element 121. In this way, by controlling pressure of gas conveyed to the pneumatic steel ball locking clamp, the steel balls 1231 can be driven to extend and retract, thereby facilitating the automatic control over the extendable and retractable movement of the stop element 121.

The pneumatic steel ball locking clamp is a standard product, and its general structure and working principle are described as follows:

The pneumatic steel ball locking clamp includes steel balls 1231, a piston rod 1232, an elastic piece 1233 and a housing 1234. The housing 1234 is provided with an accommodating cavity 1234*b*, the piston rod 1232 penetrates into the accommodating cavity 1234*b* and divides the accommodating cavity 1234*b* into a rod sub-cavity and a rodless sub-cavity, the elastic piece 1233 is located in the rod sub-cavity and connects the piston rod 1232 to an inner wall of the rod sub-cavity so as to drive the piston rod 1232 to extend and retract, the housing 1234 is provided with an air inlet hole 1234*a*, the air inlet hole 1234*a* is communicated with the rodless sub-cavity to be configured to input compressed air into the rodless sub-cavity, the housing 1234 is provided with a mounting hole communicated with the rodless sub-cavity, the steel balls 1231 are arranged in the mounting hole, and a circumferential surface of the piston rod 1232 is provided with an accommodation slot 1232*a*.

In the extended state, the input of compressed air into the rodless sub-cavity through the air inlet hole 1234*a* is stopped, and the piston rod 1232 retracts under action of the elastic piece 1233, such that an outer surface of the piston rod 1232 abuts against the steel balls 1231 and pushes the steel balls 1231 to move outwards to abut against the stop surface 11*a*, and the steel balls 1231 are clamped and fixed by the stop surface 11*a* and the outer surface of the piston rod 1232, thereby keeping the steel balls 1231 to abut against the stop surface 11*a*. In the retracted state, compressed air is input into the rodless sub-cavity through the air inlet hole 1234*a*, and the compressed air pushes the piston rod 1232 to press the elastic piece 1233 so as to make the piston rod 1232 extend out until the steel balls 1231 are pushed back into the accommodation slot 1232*a* under the abutting force of the stop surface 11*a*, such that the steel balls 1231 can be embedded into the accommodation slot 1232*a*.

It can be understood that the air inlet hole 1234*a* can be selectively connected or disconnected to an air source via an air pipeline through a second solenoid valve. The air source may be an air compressor or a compressed air tank.

The specific way to form the stop surface 11*a* is not limited.

Exemplarily, referring to FIG. 5, the inner wall of the fixing hole 11*c* is provided with a fixing protrusion 111, and a surface of the fixing protrusion 111 at a side facing away from the mounting seat assembly 12 forms the stop surface 11*a*. In this way, the stop element 121 can conveniently abut against the fixing protrusion 111 in the extended state and be separated from the fixing protrusion 111 in the retracted state.

In some embodiments, referring to FIGS. 5 and 6, the press plate assembly 11 includes a press plate body 112 and fixing shaft sleeves 113, where the press plate body 112 is provided with first mounting holes 112*a*, at least one end of the first mounting hole 112*a* is open, and the fixing shaft sleeve 113 is provided with a through second mounting hole 113*a*; the fixing shaft sleeve 113 covers the opening of the first mounting hole 112*a* and is detachably connected to the press plate body 112; the first mounting hole 112*a* communicates with the second mounting hole 113*a* to form the fixing hole 11*c*; and the fixing protrusion 111 is arranged on an inner wall of the second mounting hole 113*a*.

In this way, there is no need to directly process and manufacture the fixing protrusion 111 on the press plate body 112, thereby reducing the production and manufacturing difficulty. After long-term use, the fixing protrusion 111 is worn, only the fixing shaft sleeve 113 needs to be replaced, and the whole press plate assembly 11 does not need to be disassembled and maintained, such that the maintenance efficiency is improved, and the workload and maintenance cost are reduced.

In some embodiments, referring to FIG. 6, the press plate assembly 11 is provided with relief holes 11*d* configured to accommodate the poles of the battery 50 when the press plate assembly 11 presses against the battery 50, so as to reduce the adverse impact on the battery 50 by the action force exerted by the press plate assembly 11 on the battery 50.

Referring to FIGS. 1 to 6, the press plate module 10 in an embodiment of this disclosure is described in detail as follows:

The press plate module 10 includes the press plate assembly 11 and the mounting seat assembly 12, the press plate assembly 11 is located below the mounting seat assembly 12, and the mounting seat assembly 12 includes the locking structures 123, the adapter member 124, the mounting piece 125, the driving piece 126 and the guide protrusions 122. The driving piece 126 is arranged on the mounting piece 125, and the driving end of the driving piece 126 is drivably connected to the adapter member 124 to drive the adapter member 124 to extend and retract. The locking structure 123 is arranged at the side of the adapter member 124 facing towards the press plate assembly 11, and is the pneumatic steel ball locking clamp. The steel balls 1231 in the pneumatic steel ball locking clamp can extend and retract. The press plate assembly 11 includes the press plate body 112 and the fixing shaft sleeves 113, where the press plate body 112 is provided with first mounting holes 112*a*, at least one end of the first mounting hole 112*a* is open, and the fixing shaft sleeve 113 is provided with a through second mounting hole 113*a*; the fixing shaft sleeve 113 covers the opening of the first mounting hole 112*a* and is detachably connected to the press plate body 112; the first mounting hole 112*a* communicates with the second mounting hole 113*a* to form the fixing hole 11*c*; the fixing protrusion 111 is arranged on the inner wall of the second mounting hole 113*a*; and the stop surface 11*a* is formed on the surface of the fixing protrusion 111 at the side facing away from the mounting seat assembly 12. The press plate module 10 includes the locked state and the unlocked state. In the locked state, the steel balls 1231 are in the extended state and abut against the stop surface 11*a*, such that the press plate assembly 11 is fixed with the mounting seat assembly 12, and the mounting seat assembly 12 can drive the press plate assembly 11 to move, such that the press plate assembly 11 presses against or is separated from the battery 50. In the unlocked state, the steel balls 1231 are in the retracted state and separated from the stop surface 11*a*, such that the press plate assembly 11 is separated from the mounting seat assembly 12. The press plate assembly 11 is provided with the guide holes 11*b*, where the guide hole 11*b* is open at a side facing towards the mounting seat assembly 12, and the guide protrusion 122 and the locking structure 123 are located on a same side of the adapter member 124, and the guide protrusion 122 is able to be inserted into the guide hole 11*b* along the insertion direction of the locking structure 123 into the fixing hole 11*c*, and the locking structure 123 protrudes from the surface of the adapter member 124 at the side facing towards the press plate assembly 11 by a height of H1, and the guide protrusion 122 protrudes from the surface of the adapter member 124 at the side facing towards the press plate assembly 11 by a height of H2, where H1≤H2.

An embodiment of this disclosure further provides a production line, referring to FIG. 7, configured for assembly operations of a battery 50. The production line includes the press plate module 10 according to the foregoing embodiments, and the press plate module 10 is configured to selectively press against the battery 50, such that attachment between busbar components and poles of cells of the battery 50 is facilitated, thereby facilitating welding.

In this way, the press plate module 10 switches between a locked state and an unlocked state, such that the efficiency of replacing the press plate assembly 11 is improved in the switching process of producing different types of batteries 50 on a production line.

In some embodiments, referring to FIGS. 7 and 8, the production line includes a driving module 20, and a driving end of the driving module 20 is drivably connected to the mounting seat assembly 12 to drive the press plate module 10 to move between a working station and a replacement station.

The working station means that when the press plate module 10 is located at this position, the press plate module 10 is only in the locked state, and the mounting seat assembly 12 drives the press plate assembly 11 to move, such that the press plate assembly 11 presses against or is separated from the battery 50.

The replacement station means that when the press plate module 10 is located at this position, the press plate module 10 may be between the locked state and the unlocked state, such that the press plate module 10 can replace different types of press plate assemblies 11.

In this way, the driving module 20 drives the press plate module 10 to move between the working station and the replacement station, so as to avoid interference with assembly of the battery 50 in the process of replacing the press plate assembly 11.

The specific type of the driving module 20 is not limited.

Exemplarily, the driving module 20 includes a first mounting frame, a first driving motor and a first driving rack. The first driving rack is arranged at a top of the first mounting frame. The mounting seat assembly 12 is fixedly connected to the first driving rack. An output end of the first driving motor is provided with a first driving gear. The top of the first mounting frame is provided with a first bearing guide rail extending along a first direction. The mounting seat assembly 12 is provided with a first bearing sliding block. The first bearing sliding block is in sliding fit with the first bearing guide rail. The first driving gear meshes with the first driving rack to drive the first driving rack to move along the first direction, so as to drive the mounting seat assembly 12 to move along the first direction. By controlling the number of rotation turns of the output end of the first driving motor, the specific position of the mounting seat assembly 12 on the first bearing guide rail along the first direction is controlled, so as to realize the movement of the press plate module 10 between the working station and the replacement station.

It can be understood that there are a plurality of different types of press plate assemblies 11 on the production line, and one of different types of press plate assemblies 11 needs to selectively be fixed with the mounting seat assembly 12 according to actual needs.

In some embodiments, referring to FIGS. 7 to 10, the production line includes a temporary storage module 30. The temporary storage module 30 includes a plurality of trays 31 and a driving assembly 32. The trays 31 are configured for placing the press plate assemblies 11, and the driving assembly 32 is drivably connected to each of the trays 31 to drive each of the trays 31 to selectively move to a waiting station, enabling the tray 31 to receive a press plate assembly 11 separated from the mounting seat assembly 12, or enabling a press plate assembly 11 placed on the tray 31 to be fixed with the mounting seat assembly 12.

The trays 31 are configured to place different types of press plate assemblies 11. One tray 31 may bear only one press plate assembly 11 or a plurality of press plate assemblies 11.

Referring to FIG. 9, the driving assembly 32 is configured to drive the trays 31 to move, so as to move the press plate assembly 11 that needs to be replaced to the waiting station, or to move an empty tray 31 to the waiting station.

The waiting station refers to waiting for the press plate module 10 to reach the replacement station after the tray 31 moves to this position, such that the separated press plate assembly 11 can be placed on the empty tray 31, or the mounting seat assembly 12 can be locked with the press plate assembly 11 on the tray 31.

In this way, the driving assembly 32 is conducive to realizing the automatic control of moving the press plate assembly 11 that needs to be replaced to the waiting station and cooperating with the press plate module 10.

The specific form of the driving assembly 32 is not limited. The driving assembly includes a second mounting frame, a second driving motor and a second driving rack. The second driving rack is arranged at a top of the second mounting frame. The tray 31 is fixedly connected to the second driving rack. An output end of the second driving motor is provided with a second driving gear. The top of the second mounting frame is provided with a second bearing guide rail extending along a second direction. The tray 31 is provided with a second bearing sliding block. The second bearing sliding block is in sliding fit with the second bearing guide rail, and the second driving gear meshes with the second driving rack to drive the second driving rack to move along the second direction, so as to drive the tray 31 to move along the second direction. By controlling the number of rotation turns of the output end of the second driving motor, the specific position of the tray 31 on the second bearing guide rail along the second direction is controlled, so as to realize the purpose that the tray 31 reaches the waiting station.

In some embodiments, referring to FIG. 7, the first direction is orthogonal to the second direction to reduce the total floor space of the production line.

In some embodiments, referring to FIG. 7, the mounting seat assembly 12 is able to drive the press plate assembly 11 to move along the vertical direction. Under a condition that the press plate module 10 is located in the replacement station and one of the trays 31 is located in the waiting station, the tray 31 is located below the mounting seat assembly 12. In this way, after the press plate module 10 switches from the locked state to the unlocked state, the press plate assembly 11 can directly fall onto the tray 31 under action of gravity.

In some embodiments, referring to FIG. 10, the tray 31 includes a tray body 311 and fixing bosses 312. The fixing bosses 312 are located at one end of the tray body 311 facing towards the press plate assembly 11, and the fixing bosses 312 are configured to be inserted into the guide holes 11*b*, such that the press plate assembly 11 placed on the tray 31 is constrained in position by the fit of the fixing bosses 312 and the guide holes 11*b*, and the probability that the press plate assembly 11 falls off the tray 31 during the movement with the tray 31 is reduced.

In some embodiments, the fixing protrusions 111 are located at the top end of the tray body 311.

In some embodiments, the production line includes a conveying module 40, and the conveying module 40 is configured to convey the battery 50 to a laminating station.

The laminating station means that after the battery 50 reaches this position, the press plate module 10 located at the working station drives the press plate assembly 11 to press against the battery 50.

In this way, batteries 50 to be processed can be continuously conveyed to the laminating station and the processed batteries 50 are moved out of the laminating station.

Referring to FIGS. 7 to 10, the production line in an embodiment of this disclosure is described in detail as follows:

The production line includes the press plate module 10, the driving module 20, and the temporary storage module 30, where the driving end of the driving module 20 is drivably connected to the mounting seat assembly 12 to drive the press plate module 10 to move between the working station and the replacement station.

The temporary storage module 30 includes the plurality of trays 31 and the driving assembly 32, the trays 31 are configured for placing the press plate assemblies 11, and the driving assembly 32 is drivably connected to each of the trays 31 to drive each of the trays 31 to selectively move to the waiting station, enabling the tray 31 to receive a press plate assembly 11 separated from the mounting seat assembly 12. Alternatively, the press plate assembly 11 placed on the tray 31 can be fixed with the mounting seat assembly 12, and under the condition that the press plate module 10 is located in the replacement station and one of the trays 31 is located in the waiting station, the tray 31 is located below the mounting seat assembly 12.

An embodiment of this disclosure provides a control method for replacing a press plate assembly 11 on a production line. The control method is applied to a control device. For example, the control device may be a Programmable Logic Controller (PLC) device. As shown in FIG. 11, in an embodiment in which a first driving motor, a second driving motor, a first solenoid valve and a second solenoid valve are included, a driving piece 126 is an air cylinder, and steel balls 1231 in a pneumatic steel ball locking clamp forms a stop element 121, the method includes:

Step S01: Control a first driving motor in a driving module to drive a press plate module to move from a working station to a replacement station.

Step S02: Control a second driving motor in a driving assembly to drive an empty tray to move to a waiting station.

It can be understood that Step S01 and Step S02 may be completed successively or simultaneously.

Step S03: Control a first solenoid valve such that a cylinder in a mounting seat assembly drives a press plate assembly to move downwards to a lowest position.

Step S04: Control a second solenoid valve to retract steel balls in a pneumatic steel ball locking clamp, thereby changing the press plate module from a locked state to an unlocked state, and dropping the press plate assembly onto the tray at the waiting station.

Step S05: Control the first solenoid valve such that the cylinder in the mounting seat assembly drives an adapter member to move upwards to a highest position.

Step S06: Control the second driving motor in the driving assembly to drive the tray currently located at the waiting station to move away from the waiting station.

Step S07: Control the second driving motor in the driving assembly to drive the tray, on which the press plate assembly to be replaced is placed, to move to the waiting station.

Step S08: Control the first solenoid valve such that the cylinder in the mounting seat assembly drives the adapter member to move downwards to the lowest position.

Step S09: Control the second solenoid valve such that the steel balls in the pneumatic steel ball locking clamp extend out, thereby changing the press plate module from the unlocked state to the locked state.

Step S10: Control the first solenoid valve such that the cylinder in the mounting seat assembly drives the press plate assembly to move upwards to the highest position.

Step S11: Control the first driving motor in the driving module to drive the press plate module to move from the replacement station to the working station.

In this way, rapid and automatic replacement of the press plate assembly 11 is realized conveniently, and the working efficiency of replacing the press plate assembly 11 is improved.

Various embodiments/implementations provided in this disclosure may be combined with each other without contradiction.

The above embodiments are only preferred embodiments of this disclosure, but are not intended to limit this disclosure. For a person skilled in the art, this disclosure may have various modifications and variations. Any modification, equivalent replacement, improvement, and the like made within the spirit and principles of this disclosure shall fall within the scope of protection of this disclosure.

INDUSTRIAL PRACTICALITY

The embodiments of this disclosure are conducive to realizing rapid and automatic replacement of the press plate assembly, and the working efficiency of replacing the press plate assembly is improved.

What is claimed is:

1. A press plate module for battery assembly operations, comprising a press plate assembly and a mounting seat assembly, wherein

20 one of the mounting seat assembly and the press plate assembly is provided with a stop element and the other is provided with a stop surface, and the stop element is selectively extendable and retractable;

the press plate module has a locked state and an unlocked state;

in the locked state, the stop element is in an extended state and abuts against the stop surface, such that the press plate assembly is fixed with the mounting seat assembly, and the mounting seat assembly is able to drive the press plate assembly to move such that the press plate assembly presses against or is separated from a battery;

in the unlocked state, the stop element is in a retracted state and separated from the stop surface, such that the press plate assembly is separated from the mounting seat assembly;

one of the mounting seat assembly and the press plate assembly comprises a locking structure and the other is provided with a fixing hole;

one end of the fixing hole is open for the locking structure to be inserted into the fixing hole; and of a circumferential surface of a part of the locking structure inserted into the fixing hole and a circumferential inner wall of the fixing hole, one is provided with the stop element and the other is provided with the stop surface.

2. The press plate module according to claim 1, wherein the stop element is arranged on the mounting seat assembly, and the stop surface is arranged on the press plate assembly.

3. The press plate module according to claim 1, wherein one of the mounting seat assembly and the press plate assembly is provided with a guide protrusion and the other is provided with a guide hole; and the guide protrusion is capable of being inserted into or detached from the guide hole along a moving direction of the press plate assembly.

4. The press plate module according to claim 1, wherein for projections perpendicular to a vertical direction, in the locked state, a projection of the stop element and a projection of the stop surface at least partially overlap; and in the unlocked state, the projection of the stop element is separated from the projection of the stop surface, such that the press plate assembly is separated from the mounting seat assembly under action of gravity.

5. The press plate module according to claim 1, wherein the mounting seat assembly comprises the locking structure and an adapter member;

the locking structure is arranged at a side of the adapter member facing towards the press plate assembly;

at least part of the locking structure protrudes from a surface of the adapter member at a side facing towards the press plate assembly; and the stop element is located at a protruding part of the locking structure.

6. The press plate module according to claim 5, wherein the mounting seat assembly comprises a mounting piece and a driving piece, the driving piece is arranged on the mounting piece, and a driving end of the driving piece is drivably connected to the adapter member to drive the adapter member to extend and retract.

7. The press plate module according to claim 5, wherein the mounting seat assembly comprises a guide protrusion, and the press plate assembly is provided with a guide hole the guide hole is open at a side facing towards the mounting seat assembly;

the guide protrusion and the locking structure are located on a same side of the adapter member;

the guide protrusion is capable of being inserted into the guide hole along an insertion direction of the locking structure into the fixing hole;

the locking structure protrudes from the surface of the adapter member at the side facing towards the press plate assembly by a height of H1; and the guide protrusion protrudes from the surface of the adapter member at the side facing towards the press plate assembly by a height of H2, wherein H1≤H2.

8. The press plate module according to claim 1, wherein the locking structure is a pneumatic steel ball locking clamp, and steel balls of the pneumatic steel ball locking clamp form the stop element.

9. The press plate module according to claim 1, wherein the inner wall of the fixing hole is provided with a fixing protrusion, and a surface of the fixing protrusion at a side facing away from the mounting seat assembly forms the stop surface.

10. The press plate module according to claim 9, wherein the press plate assembly comprises a press plate body and a fixing shaft sleeve;

the press plate body is provided with a first mounting hole, at least one end of the first mounting hole is open, and the fixing shaft sleeve is provided with a through second mounting hole;

the fixing shaft sleeve covers an opening of the first mounting hole and is detachably connected to the press plate body;

the first mounting hole communicates with the second mounting hole to form the fixing hole; and the fixing protrusion is arranged on an inner wall of the second mounting hole.

11. A production line for battery assembly operations, wherein the production line comprises the press plate module according to claim 1, and the press plate module is configured to selectively press against the battery.

12. The production line according to claim 11, wherein the production line further comprises a driving module, and a driving end of the driving module is drivably connected to the mounting seat assembly to drive the press plate module to move between a working station and a replacement station.

13. The production line according to claim 12, wherein the production line comprises a plurality of press plate modules, each press plate module comprising a press plate assembly and a corresponding mounting seat assembly;

the production line further comprises a temporary storage module, and the temporary storage module comprises a plurality of trays and a driving assembly;

the driving assembly is drivably connected to each of the trays, so as to selectively move one of the trays to a waiting station, enabling the tray to receive a press plate assembly separated from a corresponding mounting seat assembly, or enabling the press plate assembly placed on the tray to be fixed with the corresponding mounting seat assembly.

14. The production line according to claim 13, wherein in each press plate module, the mounting seat assembly is configured to drive the press plate assembly to move along a vertical direction, and under a condition that the press plate module is located in the replacement station and one of the trays is located in the waiting station, the tray is located below the mounting seat assembly.

* * * * *